United States Patent
Haimerl et al.

(10) Patent No.: US 6,836,219 B2
(45) Date of Patent: Dec. 28, 2004

(54) METHOD FOR SYNCHRONIZING AT LEAST TWO CONTROL DEVICES

(75) Inventors: Michael Haimerl, Cham (DE); Wolf-Dieter Pöhmerer, Regensburg (DE); Hans-Jürgen Reichl, Salching (DE); Ulli Christian Sagmeister, Postmünster (DE); Markus Teiner, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 375 days.

(21) Appl. No.: 10/158,747

(22) Filed: May 30, 2002

(65) Prior Publication Data

US 2002/0167419 A1 Nov. 14, 2002

Related U.S. Application Data

(63) Continuation of application No. PCT/DE00/04226, filed on Nov. 28, 2000.

(30) Foreign Application Priority Data

Nov. 30, 1999 (DE) .......................................... 199 57 551

(51) Int. Cl.[7] .............................................. G08C 15/08
(52) U.S. Cl. ........................... 340/870.14; 123/406.58; 701/102; 340/870.07
(58) Field of Search ....................... 340/870.07, 870.14; 123/406.12, 406.52, 406.58; 701/101, 102

(56) References Cited

U.S. PATENT DOCUMENTS

| | | | |
|---|---|---|---|
| 4,783,998 A | * 11/1988 | Sander | .......................... 73/660 |
| 5,402,394 A | 3/1995 | Turski | |
| 5,623,412 A | * 4/1997 | Masson et al. | ............. 701/101 |
| 5,748,941 A | 5/1998 | Rabjohns | |
| 5,762,054 A | * 6/1998 | Schumacher et al. | ....... 123/674 |
| 5,918,040 A | 6/1999 | Jarvis | |

FOREIGN PATENT DOCUMENTS

| | | |
|---|---|---|
| DE | 41 40 017 C2 | 6/1993 |
| DE | 198 15 647 A1 | 10/1999 |
| EP | 0 613 271 A2 | 8/1994 |
| EP | 0 846 993 A1 | 6/1998 |
| JP | 04 294 413 | 10/1992 |

\* cited by examiner

Primary Examiner—Timothy Edwards, Jr.
(74) Attorney, Agent, or Firm—Laurence A. Greenberg; Werner H. Stemer; Ralph E. Locher

(57) ABSTRACT

A sensor device having an incremental encoder and a measuring sensor generating a measuring signal is assigned to two control devices. A synchronization device generates a synchronization signal. A conditioned first measuring signal is generated in the first control device as a function of the measuring signal. A conditioned second measuring signal is generated in the second control device as a function of the measuring signal. The value of the conditioned first measuring signal at a predefined time after the reception of the synchronization signal in the first control device is transmitted to the second control device. The second control device synchronizes the conditioned second measuring signal as a function of the values of the conditioned first and second measuring signals that the signals have at the predefined time after the respective reception of the synchronization signal in the first and second control devices.

7 Claims, 3 Drawing Sheets

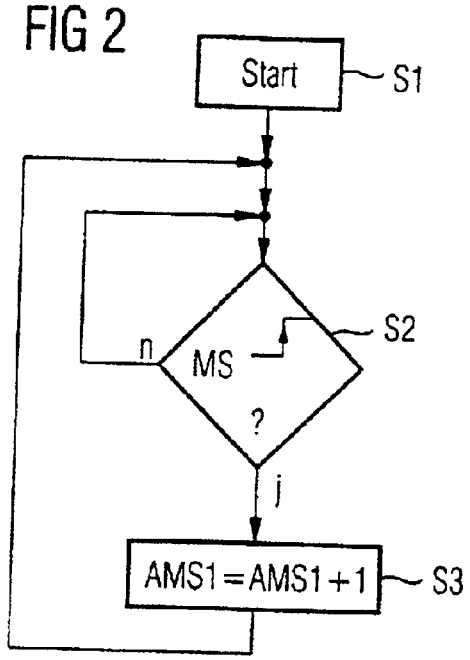
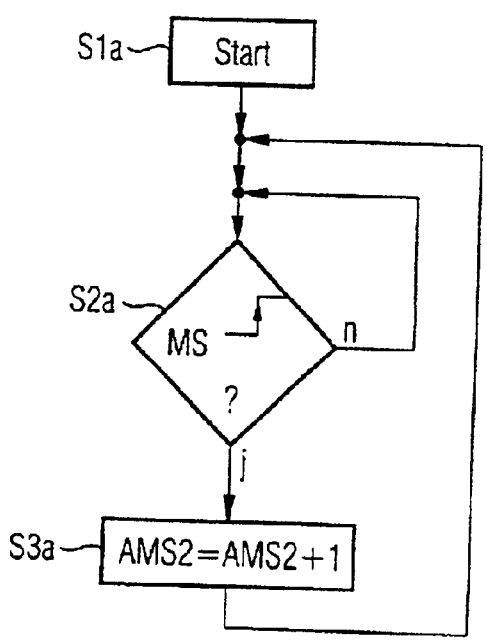

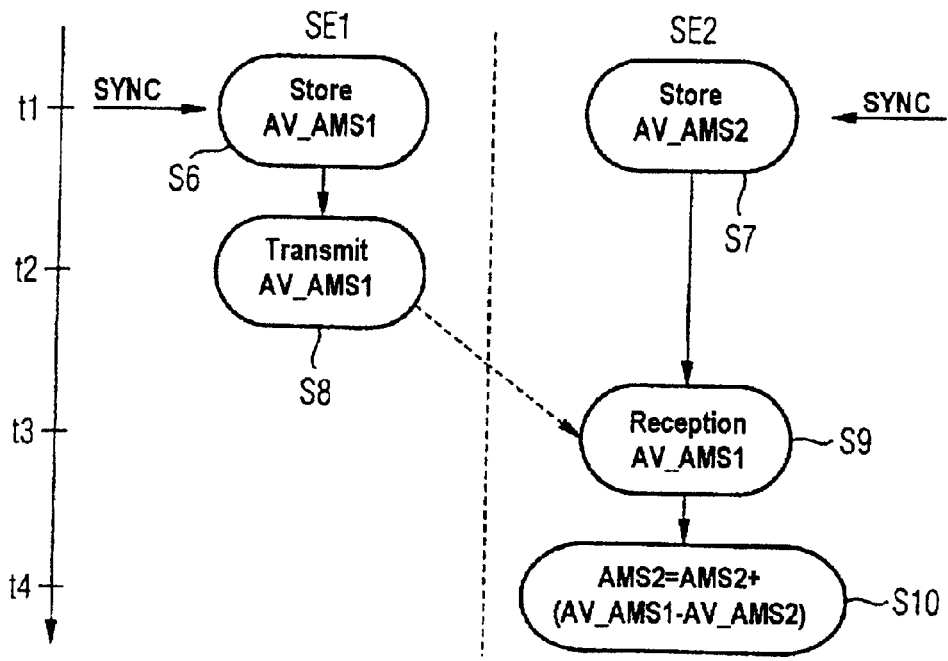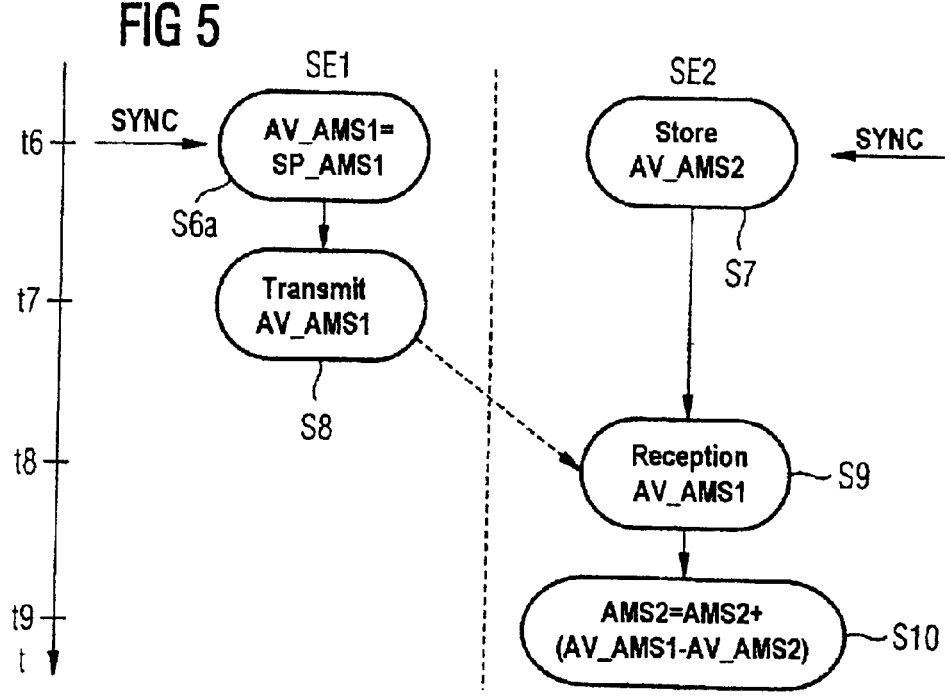

METHOD FOR SYNCHRONIZING AT LEAST TWO CONTROL DEVICES

CROSS-REFERENCE TO RELATED APPLICATION

This application is a continuation of copending International Application No. PCT/DE00/04226, filed Nov. 28, 2000, which designated the United States and was not published in English.

BACKGROUND OF THE INVENTION

Field of the Invention

The invention relates to a method for synchronizing at least two control devices.

Modern motor vehicles are frequently equipped with a multiplicity of control devices. In each case one or more control devices are provided for controlling engine operating functions, and if appropriate, for actuating throttle valves, electromechanical actuator drives or a crankshaft starter generator (KSG), or further actuators.

Various actuator elements, for example injection valves, spark plugs and charge cycle valves, are actuated by the control device or devices as a function of the angular position of the crankshaft of the internal combustion engine.

For this reason, in internal combustion engines, a sensor device is provided which has an incremental angle encoder and a measuring sensor which generates a measuring signal. The measuring signal is preferably a pulse sequence.

The individual control devices are connected to the sensor device via a signal line and receive the measuring signal. They process the measuring signal further by counting the pulses.

The counter readings or angular values of the conditioned measuring signals derived therefrom can be distinguished in the individual control devices as a function of when the respective control device starts counting the pulses and as a function of instances when individual pulses are registered incorrectly or else instances in which they are not registered.

In order to exchange information, individual control devices are connected via a data bus, for example the CAN (Controller Area Network) bus. For example, control instructions for actuating charge cycle valves are transmitted at predefined angles of the crankshaft by the control device for controlling engine operating functions. Reliable operation of the motor vehicle in which the control devices are arranged can be ensured only if the conditioned measuring signals are synchronized in the individual control devices.

Issued German Patent DE 41 40 017 C2 discloses a method for operating computer units that communicate with one another via a data bus by exchanging data serially. Each of the computer units has its own timer system. A time registration signal is fed into the data bus once or repeatedly. Each computer unit stores its own time value when the time registration start signal is identified. One of the computer units then transmits its own stored time value to the other computer units. The other computer units synchronize their own time base as a function of their own stored time value and the time value of the other computer unit. There is no central clock supply provided for the computer units.

SUMMARY OF THE INVENTION

It is accordingly an object of the invention to provide a method for synchronizing at least two control devices that is reliable and simple.

With the foregoing and other objects in view there is provided, in accordance with the invention, a method for synchronizing at least a first control device and a second control device. The method includes steps of: providing a communication link between the first control device and the second control device; providing a sensor device having a measuring sensor for generating a measuring signal and a device selected from the group consisting of an incremental angle encoder and a position encoder; assigning a synchronization device to the first control device and to the second control device, and configuring the synchronization device for generating a synchronization signal; generating a conditioned first measuring signal in the first control device as a function of the measuring signal; generating a conditioned second measuring signal in the second control device as a function of the measuring signal; in the first control device, receiving the synchronization signal at an instant of time and obtaining a value of the conditioned first measuring signal at a predefined time after the instant of time that the synchronization signal was received by the first control device; in the second control device, receiving the synchronization signal at an instant of time and obtaining a value of the conditioned second measuring signal at a predefined time after the instant of time that the synchronization signal was received in the second control device; transmitting the value of the conditioned first measuring signal obtained at the predefined time after the instant of time that the synchronization signal was received by the first control device, from the first control device to the second control device; with the second control device, synchronizing the conditioned second measuring signal dependent upon a difference value; and obtaining the difference value by taking a difference between the value of the conditioned first measuring signal obtained at the predefined time after the instant of time that the synchronization signal was received by the first control device and the value of the conditioned second measuring signal obtained at the predefined time after the instant of time that the synchronization signal was received by the second control device.

In accordance with an added feature of the invention, the conditioned first measuring signal is generated by counting edges of the measuring signal; and the conditioned second measuring signal is generated by counting edges of the measuring signal.

In accordance with an additional feature of the invention, the synchronization device is configured as part of the sensor device.

In accordance with another feature of the invention, before transmitting the value of the conditioned first measuring signal from the first control device to the second control device, the value of the conditioned first measuring signal is set to a setpoint value.

With the foregoing and other objects in view there is also provided, in accordance with the invention, a method for synchronizing at least a first control device and a second control device in which the method includes steps of: providing a communication link between the first control device and the second control device; providing a sensor device having a measuring sensor for generating a measuring signal and a device selected from the group consisting of an incremental angle encoder and a position encoder; assigning a synchronization device to the first control device and to the second control device, and configuring the synchronization device for generating a synchronization signal; generating a conditioned first measuring signal in the first control device as a function of the measuring signal; generating a conditioned second measuring signal in the second control device as a function of the measuring signal; in the first control device, receiving the synchronization signal at an instant of time and setting a value to a setpoint value, the value being a value of the conditioned first measuring signal at a predefined time after the instant of time that the synchronization signal was received by the first control device; in the second control device, receiving the synchronization signal at an instant of time and obtaining a value of the conditioned second measuring signal at a predefined time after the instant of time that the synchronization signal was received in the second control device; transmitting the value of the conditioned first measuring signal at the predefined time after the instant of time that the synchronization signal was received by the first control device, from the first control device to the second control device; with the second control device, synchronizing the conditioned second measuring signal dependent upon a difference value; and obtaining the difference value by taking a difference between the value of the conditioned first measuring signal at the predefined time after the instant of time that the synchronization signal was received by the first control device and the value of the conditioned second measuring signal obtained at the predefined time after the instant of time that the synchronization signal was received by the second control device.

Other features which are considered as characteristic for the invention are set forth in the appended claims.

Although the invention is illustrated and described herein as embodied in a method for synchronizing at least two control devices, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 shows a flowchart for determining a first conditioned measuring signal;

FIG. 3 shows a flowchart for determining a second conditioned measuring signal;

FIG. 4 shows a time-related flowchart for synchronizing the first control device and the second control device; and FIG. 5 shows a further flowchart for synchronizing the first control device and the second control device.

DESCRIPTION OF THE PREFERRED EMBODIMENTS

Figure 1:
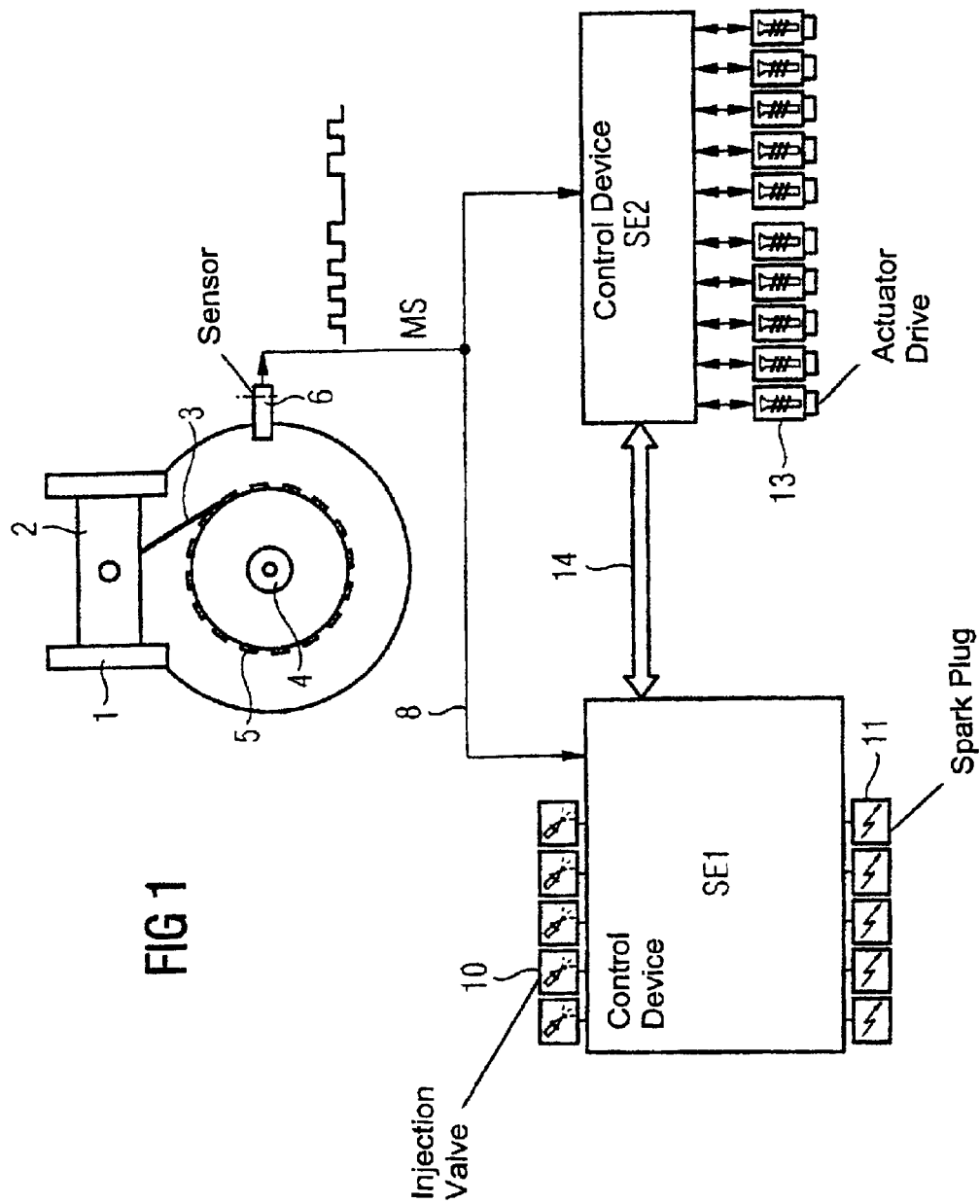
FIG. 1 shows an internal combustion engine with an assigned first control device and second control device.

Referring now to the figures of the drawing in detail and first, particularly, to FIG. 1 thereof, there is shown an internal combustion engine with a cylinder 1 in which a piston 2 is movably arranged. The piston 2 is coupled to a crankshaft 4 via a connecting rod 3.

An angle encoder 5, which is preferably embodied as a gearwheel 5, is arranged on the crankshaft 4. The gearwheel has, for example, sixty teeth which are at equal distances apart with the exception of a defined gap.

A measuring sensor 6, which is preferably embodied as a Hall element or inductive sensor, is permanently arranged in the crankshaft casing of the internal combustion engine and generates a pulse-shaped measuring signal MS when the crankshaft 4 rotates. At a constant rotational speed, the measuring signal MS has pulses with a constant period length with the exception of a pulse with a relatively long period length due to the gap in the gearwheel, or else has a uniform pulse-to-mark ratio with the exception of a relatively long mark per revolution due to the gap in the gearwheel. This relatively long gap or else relatively long period length serves as a synchronization signal SYNC.

A first control device SE1 for controlling operating functions of the engine is provided. Sensors which register various measurement variables and each determine the measured value of the measurement variable are assigned to the control device. The first control device SE1 determines, as a function of at least one measurement variable, one or more actuation signals which each control an actuator.

The sensors are, for example, a pedal position sensor, a throttle valve position sensor, an air mass flow rate meter, a temperature sensor, the sensor device or further sensors.

The actuators each include an actuator drive and an actuator element. The actuator drive is an electromotor drive, an electromagnetic drive or a further drive known to the person skilled in the art. The actuator elements are embodied as a throttle valve, as an injection valve 10, or as a spark plug 11 for example.

The first control device SE1 is connected to the measuring sensor 6 via a signal line 8. In addition, it is connected to a second control device SE2 via a bus 14, which is preferably embodied as a CAN bus. The bus 14 is thus a communication device that is assigned to the first and second control devices SE1, SE2. The communication device can also include a transmitter and a receiver that are assigned to the first and/or second control device SE1, SE2 and that transmit or receive a radio signal.

The second control device SE2 determines and generates actuation signals for actuating electromechanical actuator drives 13 for charge cycle valves of the internal combustion engine. The second control device SE2 communicates with the first control device SE1 via the bus 14. The first control device SE1 provides the second control device SE2 with information or control instructions relating to the start of opening and the end of opening of the charge cycle valves referenced to the crankshaft angle of the crankshaft 4.

The second control device is also connected to the measuring sensor 6 via the signal line 8.

A flowchart of a program for conditioning the measuring signal MS in the first control device SE1 is illustrated in FIG. 2. The program is started in a step S1.

In a step S2, it is checked whether the measuring signal MS has a rising edge. If this is not the case, the condition of the step S2 is checked again, if appropriate after a predefined delay time. If the condition of the step S2 is fulfilled, a first conditioned measuring signal is incremented by the value one.

The conditioned first measuring signal AMS1 is preferably initialized to a predefined value (for example zero) in the step S1. The respective current counter reading of the first conditioned measuring signal AMS1 is a particularly simple indication of the angle of the crankshaft 4. However, the counter reading can alternatively also be converted, for example, into an assigned angular value so that the conditioned first measuring signal AMS1 directly has an angular value. A further higher degree of precision of the conditioned measuring signal can be achieved by interpolating the counter reading or angular value between two successive edges of the measuring signal MS.

FIG. 3 shows the corresponding flowchart of the program which is processed in the second control device SE2. The program is started in a step S1a in which a second conditioned measuring signal AMS2 is preferably initialized.

In a step S2a it is checked whether the measuring signal MS has a rising edge. If this is not the case, the condition of the step S2a is checked again, if appropriate after a predefined waiting time. However, if this is the case, the conditioned second measuring signal AMS2 is incremented by the value 1 in a step S3a. The statements relating to the first conditioned measuring signal AMS1 apply appropriately to the second conditioned measuring signal AMS2. In the steps S2 in FIG. 2 and step S2a in FIG. 3 it is also alternatively possible to check whether the measuring signal MS has a trailing edge.

FIG. 4 illustrates a flowchart for synchronizing the first control device SE1 and the second control device SE2. The steps which are carried out in the first control device SE1 are illustrated to the left of the vertical dashed line, while the steps which are carried out in the second control device SE2 are illustrated to the right of the vertical dashed line. The time sequence (time t) of the respective steps can be seen in FIG. 4.

A step S6 is carried out in the first control device as soon as the first control device SE1 receives the synchronization signal SYNC at a time t1. The synchronization signal SYNC is derived from the lengthened pulse mark of the measuring signal MS which is caused by the gap in the gearwheel. The synchronization device is advantageously integrated into the sensor device.

When the synchronization signal SYNC is received at the time t1, the current value AV_AMS1 of the conditioned first measuring signal AMS1 is stored in the first control device SE1. Alternatively, it is also possible to store the current value of the conditioned first measuring signal AV_AMS1 only after a predefined time period (for example 0.1 ms) after receiving the synchronization SYNC.

The second control device SE2 also receives the synchronization signal SYNC at the time t1, and in accordance with the first control device SE1, it stores the value of the conditioned second measuring signal AV_AMS2 either immediately or after the predefined time period.

At the time t2, which preferably directly follows the termination of step S6, the first control device SE1 transmits, in a step S8, the value AV_AMS1 of the conditioned first measuring signal AMS1 to the second control device SE2 via the bus 14. At a time t3, the second control device SE2 receives, in a step S9, the value AV_AMS1 of the conditioned first measuring signal AMS1 that was taken at the time t1.

At a time t4, the second control device SE2 synchronizes the conditioned second measuring signal AMS2 in a step S10. For this purpose, it preferably forms the difference between the values AV_AMS1 and AV_AMS2 of the conditioned first and second measuring signals that were obtained at the time t1 and adds the difference to the conditioned second measuring signal AMS2.

The conditioned first and second measuring signals AMS1 and AMS2 are thus synchronized after the execution of the step S9 in the second control device SE2. This ensures that, in the second control device, the control instructions which are transmitted from the first control device to open or close the charge cycle valves are also actually carried out at the crankshaft angle which is predefined by the first control device.

The time t4 occurs before renewed reception of the synchronization signal SYNC. This thus ensures that the value AV_AMS2 was sensed at the same time as the value AV_AMS1.

FIG. 5 shows a further flowchart for synchronizing the first and second control device SE1 and SE2. The time sequence of the execution of the steps S6a, S7, S8, S9, S10 corresponds to the execution of the steps S6 to S10 in FIG. 4, that is to say the time intervals between the times t1–t4 corresponds to those between the times t6, t7, t8 and t9.

At the time t6, the synchronization signal SYNC is received in the first control device and a predefined setpoint value SP_AMS1 of the second conditioned measuring signal is assigned to the current value AV_AMS1 of the conditioned first measuring signal. This has the advantage that the conditioned measuring signal of the first control device is also respectively synchronized when the synchronization signal is received.

It is also possible to provide more than two control devices. In this case, the first control device SE1 transmits to all the other control devices the value AV_AMS1 of the conditioned first measuring signal which it has at the predefined time starting from the reception of the synchronization signal in the first control device to all the other control devices which then synchronize to this value.

In addition, it is also possible to provide, instead of the sensor device which includes an angle encoder, a sensor device which has an incremental length encoder or position encoder and whose measuring sensor also generates a measuring signal. The synchronization mechanism can also be embodied separately from the sensor device. It then preferably includes a sensor that is arranged on the crankshaft 4, and a measuring sensor that is arranged in a stationary way in the crankshaft casing.

We claim:

1. A method for synchronizing at least a first control device and a second control device, which comprises:
  providing a communication link between the first control device and the second control device;
  providing a sensor device having a measuring sensor for generating a measuring signal and a device selected from the group consisting of an incremental angle encoder and a position encoder;
  assigning a synchronization device to the first control device and to the second control device, and configuring the synchronization device for generating a synchronization signal;
  generating a conditioned first measuring signal in the first control device as a function of the measuring signal;
  generating a conditioned second measuring signal in the second control device as a function of the measuring signal;
  in the first control device, receiving the synchronization signal at an instant of time and obtaining a value of the conditioned first measuring signal at a predefined time after the instant of time that the synchronization signal was received by the first control device;
  in the second control device, receiving the synchronization signal at an instant of time and obtaining a value of the conditioned second measuring signal at a predefined time after the instant of time that the synchronization signal was received in the second control device;
  transmitting the value of the conditioned first measuring signal obtained at the predefined time after the instant of time that the synchronization signal was received by the first control device, from the first control device to the second control device;
  with the second control device, synchronizing the conditioned second measuring signal dependent upon a difference value; and obtaining the difference value by taking a difference between the value of the conditioned first measuring signal obtained at the predefined time after the instant of time that the synchronization signal was received by the first control device and the value of the conditioned second measuring signal obtained at the predefined time after the instant of time that the synchronization signal was received by the second control device.

2. The method according to claim 1, which comprises:

generating the conditioned first measuring signal by counting edges of the measuring signal; and generating the conditioned second measuring signal by counting edges of the measuring signal.

3. The method according to claim 1, which comprises: providing the synchronization device as part of the sensor device.

4. The method according to claim 1, which comprises: before transmitting the value of the conditioned first measuring signal from the first control device to the second control device, setting the value of the conditioned first measuring signal to a setpoint value.

5. A method for synchronizing at least a first control device and a second control device, which comprises:

providing a communication link between the first control device and the second control device;

providing a sensor device having a measuring sensor for generating a measuring signal and a device selected from the group consisting of an incremental angle encoder and a position encoder;

assigning a synchronization device to the first control device and to the second control device, and configuring the synchronization device for generating a synchronization signal;

generating a conditioned first measuring signal in the first control device as a function of the measuring signal;

generating a conditioned second measuring signal in the second control device as a function of the measuring signal;

in the first control device, receiving the synchronization signal at an instant of time and setting a value to a setpoint value, the value being a value of the conditioned first measuring signal at a predefined time after the instant of time that the synchronization signal was received by the first control device;

in the second control device, receiving the synchronization signal at an instant of time and obtaining a value of the conditioned second measuring signal at a predefined time after the instant of time that the synchronization signal was received in the second control device;

transmitting the value of the conditioned first measuring signal at the predefined time after the instant of time that the synchronization signal was received by the first control device, from the first control device to the second control device;

with the second control device, synchronizing the conditioned second measuring signal dependent upon a difference value; and obtaining the difference value by taking a difference between the value of the conditioned first measuring signal at the predefined time after the instant of time that the synchronization signal was received by the first control device and the value of the conditioned second measuring signal obtained at the predefined time after the instant of time that the synchronization signal was received by the second control device.

6. The method according to claim 5, which comprises:

generating the conditioned first measuring signal by counting edges of the measuring signal; and generating the conditioned second measuring signal by counting edges of the measuring signal.

7. The method according to claim 5, which comprises: providing the synchronization device as part of the sensor device.

* * * * *